United States Patent [19]

Stifter

[11] Patent Number: 4,749,908
[45] Date of Patent: Jun. 7, 1988

[54] EMERGENCY POWER SUPPLY

[75] Inventor: Francis J. Stifter, Natick, Mass.

[73] Assignee: Electronic Specialists, Inc., Natick, Mass.

[21] Appl. No.: 813,374

[22] Filed: Dec. 26, 1985

[51] Int. Cl.$^4$ .................... H02M 7/537; H02V 9/00
[52] U.S. Cl. ........................ 315/86; 315/33;
  315/87; 315/16 D; 315/161; 315/165; 315/172;
  315/175; 362/183; 307/64; 307/66; 307/11;
  307/23
[58] Field of Search ............. 315/86, 87, 33, 160,
  315/165, 172, 175, 161; 362/183; 307/66, 11,
  23, 64

[56] References Cited

U.S. PATENT DOCUMENTS

| | | | |
|---|---|---|---|
| 2,106,968 | 2/1938 | Dannheiser | 315/86 |
| 2,590,611 | 3/1952 | Gunter | 315/86 |
| 2,868,996 | 1/1959 | McCord | 315/86 |
| 3,377,505 | 4/1968 | Engle | 315/86 |
| 3,792,314 | 2/1974 | Epstein et al. | 307/66 |
| 3,819,980 | 6/1974 | Mullersman | 315/86 |
| 4,009,419 | 2/1977 | Ligman | 307/64 |
| 4,115,704 | 9/1978 | Hannemann et al. | 307/64 |
| 4,144,462 | 3/1979 | Sieron et al. | 315/86 |
| 4,255,746 | 3/1981 | Johnson et al. | 362/183 |
| 4,297,614 | 10/1981 | Chandler | 315/86 |
| 4,349,863 | 9/1982 | Petersen | 362/183 |
| 4,366,389 | 12/1982 | Hussey | 307/66 |
| 4,366,390 | 12/1982 | Rathmann | 307/66 |
| 4,535,391 | 8/1985 | Hsiao | 362/183 |
| 4,553,039 | 11/1985 | Stifter | 307/64 |
| 4,556,802 | 12/1985 | Harada et al. | 307/66 |
| 4,604,530 | 8/1986 | Shibuya | 307/66 |
| 4,634,888 | 1/1987 | Deavenport | 307/64 |
| 4,638,176 | 1/1987 | Martinelli | 307/64 |

Primary Examiner—David K. Moore
Assistant Examiner—Michael J. Nickerson
Attorney, Agent, or Firm—John E. Toupal; Harold G. Jarcho

[57] ABSTRACT

An emergency power supply including an input for connection to a power line, an output for connecting the input to electrical equipment so as to supply power thereto from the power line, a supplemental power supply connected to the output and adapted to supply power to the electrical equipment upon a power abnormality in the power line, an electrical energy storage means connected to the supplemental power supply and adapted to supply electrical energy thereto; and a circuit for detecting the abnormalities in the power line. Also included are an illumination means and a switch responsive to the sensing circuit and connected between the energy storage means and the illumination means, the switch being operable to provide electrical energy flow between the storage means and the illumination means so as to cause illumination thereof during given periods in which the power abnormalities are detected by the sensing circuit and operable to prevent energy flow between the storage means and the illumination means during other periods in which the power abnormalities are not detected by the sensing circuit.

19 Claims, 1 Drawing Sheet

EMERGENCY POWER SUPPLY

BACKGROUND OF THE INVENTION

This invention relates to an emergency power supply, and, more particularly, to an emergency power supply for supplying both electrical power and light during power interruptions.

Continuous energization is a requirement of many types of electrical and electronic equipment. Well known examples of equipment requiring continuous energization include computers and medical instruments. Even extremely brief interruptions of power to such equipment can cause serious if not calamitous problems.

To alleviate problems associated with power interruption, there have been developed various systems for producing emergency power in the event of a fialure of a principal power source. Although such emergency systems insure the continuous operation of electrical equipment, the absence of light that often accompanies power interruptions can hinder the activities of personnel operating that equipment. Temporary lighting during periods of power interruption typically is provided by flashlights, the use of which is rather inconvenient. In addition, the absence of temporary lighting or a delay in obtaining temporary lighting can cause undesirable consequences. Computer operators, for example, often have a limited time period in which to take operational steps that will prevent the loss of data stored in memory banks since emergency power supplies usually are powered by batteries with limited life. Thus, the immediate availablity of light is highly desirable during periods in which a primary power source has failed and electrical equipment is being operated by an emergency power supply.

The object of this invention, therefore, is to provide a power supply that will provide automatically both emergency power for electrical equipment and illumination for operators of that equipment.

SUMMARY OF THE INVENTION

The invention is an emergency power supply including an input for connection to a power line, an output for connecting the input to electrical equipment so as to supply power thereto from the power line, a supplemental power supply connected to the output and adapted to supply power to the electrical equipment upon a power abnormality in the power line, an electrical energy storage means connected to the supplemental power supply and adapted to supply electrical energy thereto; and a circuit for detecting the abnormalities in the power line. Also included are an illumination means and a switch responsive to the sensing circuit and connected between the energy storage means and the illumination means, the switch being operable to provide electrical energy flow between the storage means and the illumination means so as to cause illumination thereof during given periods in which the power abnormalities are detected by the sensing circuit and operable to prevent energy flow between the storage means and the illumination means during other periods in which the power abnormalities are not detected by the sensing circuit. During periods of detected power line abnormalities, the storage means automatically energizes the illumination means to provide emergency lighting for operators of the electrical equipment.

According to certain features of the invention, the detected abnormalities comprise power interruptions in an AC power line, the energy storage means is a battery connected to the input so as to store electrical energy received from the power line, and the supplemental power supply comprises an uninterruptible power supply connected between the input and the output. These features enhance the operational characteristics of the supply.

According to another feature of the invention, the emergency supply includes a housing retaining the supplemental power supply, the energy storage means, the sensing circuit, and the switch; and the illumination means comprises a portable light disposed externally of the housing and connected to the switch by an elongated connector that permits substantial relative movement between the portable light and the housing. The portable light enhances the utility of the emergency lighting system.

According to yet another feature of the invention, the switch is connected directly between the energy storage means and the illumination means and is isolated from the supplemental power supply so as to prevent electrical energy flow between the illumination means and the supplemental supply. This arrangement eliminates any lighting power loss in the supplemental power supply.

According to a further feature of the invention, the illumination means produces a minimum 1.0 milli standard candle power. This minimum candle power provides sufficient emergency lighting for performing required operations.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
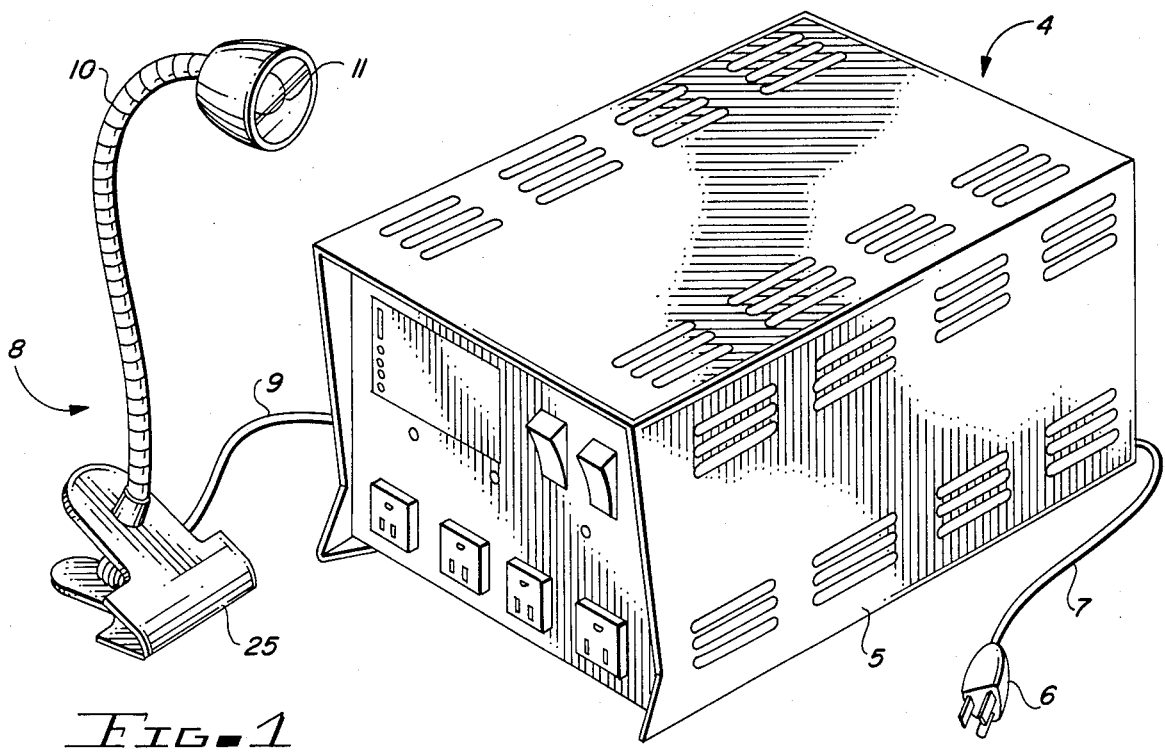
FIG. 1 is a schematic illustration of the invention.

An emergency power and lighting system 4 is shown in FIG. 1. The system 4 includes an uninterruptible power supply retained with a housing 5 and electrically connectable to an AC power line by a plug 6 on an input cord 7. Extending between a portable light fixture 8 and the uninterruptible power supply within the housing 5 is an elongated electrical cord 9. The light fixture 8 includes a flexible neck 10 that terminates with a socket for a light bult 11. Preferably, the light bulb 11 provides illumination of greater than 1.0 milli standard candle power.

Figure 2:
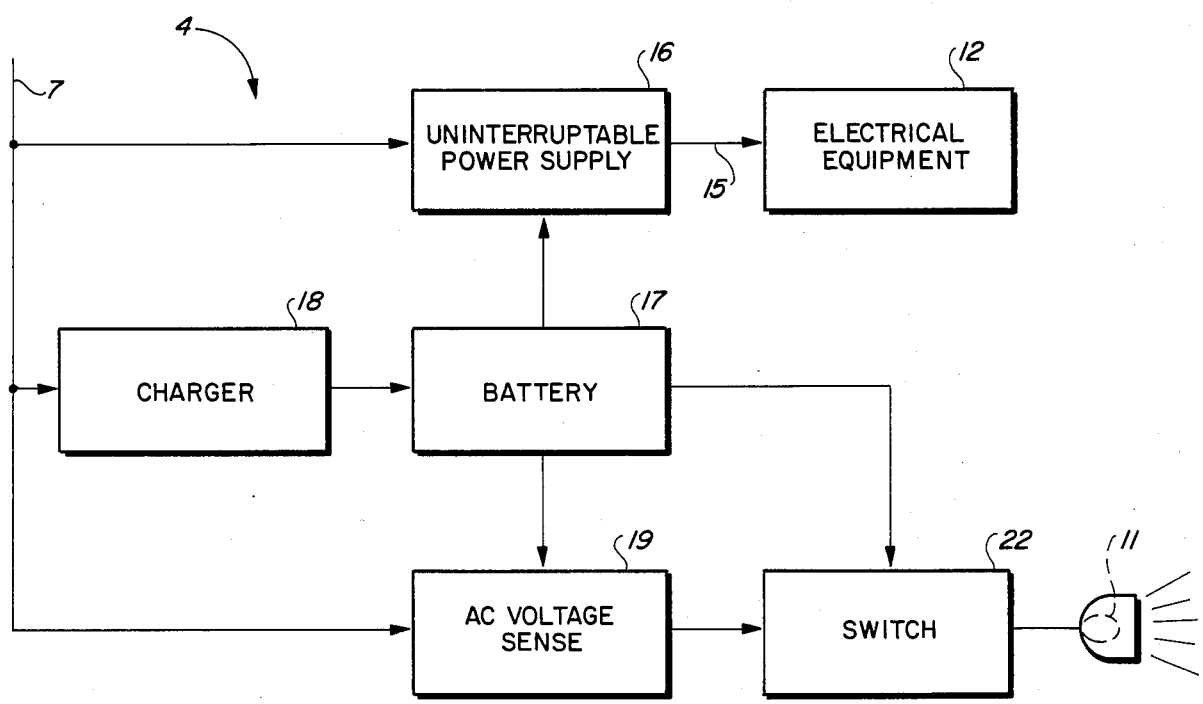
FIG. 2 is a schematic block circuit diagram of the supply shown in FIG. 1.

Illustrated in FIG. 2 is a block circuit diagram of the emergency power system 4 connected to electrical equipment 12 such as a computer or a medical instrument. The system 4 includes the input line 7 for connection to an AC power line and an output line 15 connected to the electrical equipment 12. Connected between the input line 7 and the output line 15 is an uninterruptible power supply 16 that can be, for example, the type disclosed in U.S. Pat. No. 4,553,039. Also included in the system 4 is a battery 17 that is connected to the input line 7 by a battery charger 18. The battery 17 supplies power to the power supply 16 and to an AC voltage sensor 19 that is also connected to the input line 7. Connected between the battery 17 and the light bulb 11 in the portable light fixture 8 is a switch 22 that is actuated by the voltage sensor 19.

OPERATION

During normal conditions the uninterruptible power supply 16 is operated by power on the input line 7 derived from an AC power line and supplies operating power to the equipment 12 on the output line 15. The charger 18 draws power from the input line 13 and maintains a full charge on the battery. Detecting the presence of line voltage on the input line 7 is the AC voltage sensor 19 that responds to that condition by maintaining the switch 22 open to thereby disconnect the light from the battery 17.

Under abnormal conditions when AC line power on the input line 13 has been disrupted, power to the equipment 12 is derived from the battery 17. The battry voltage is converted by the uninterruptible power supply 16 to a voltage suitable for operation of the equipment 12. Detecting an absence of AC line voltage on the input line 13, the AC voltage sensor 19 automatically activates the switch 22 into a closed condition connecting the battery 17 to the light 8. The resultant energization of the bulb 11 provides immediate illumination for personnel operating the equipment 12. Because the light 8 is connected directly to the battery 17 by the switch 22, no lighting power is consumed in the power supply 16. In addition, a clip 25 secured to the base of the flexible neck 10 can be used to conveniently position the light fixture 8.

Obviously, many modifications and variations of the present invention are possible in light of the above teachings. For example, although the invention has been described in conjunction with an uninterruptible power supply 16, it will be apparent that the invention could be used also with the standby emergency power supply. It is to be understood, therefore, that the invention can be practiced otherwise than as specifically described.

What is claimed is:

1. An emergency power supply comprising:
   input means for connection to a power line;
   output means for connecting said input means to electrical equipment so as to supply power thereto from the power line;
   supplemental power supply means connected to said output means and adapted to supply power to the electrical equipment upon a power abnormality in the power line;
   electrical energy storage means connected to said supplement power supply means and adapted to supply electrical energy thereto;
   sensing means for detecting said abnormalities in the power line;
   illumination means;
   switch means responsive to said sensing means and connected between said energy storage means and said illumination means, said switch means being operable to provide electrical energy flow between said storage means and said illumination means so as to cause illumination thereof during given periods in which said power abnormalities are detected by said sensing means and operable to prevent energy flow to said illumination means during other periods in whch said power abnormalities are not detected by said sensing means; and
   a portable housing means retaining said supplemental power supply means, said energy storage means, and said sensing means; and wherein said illumination means comprises a portable light disposed externally of said housing and connected thereto by an elongated connector that permits substantial relative movement between said portable light and said housing thereby permitting said light to be positioned so as to illuminate the electrical equipment.

2. A supply according to claim 1 wherein said abnormalities comprise power interruptions in the power line.

3. A supply according to claim 2 wherein the power line is an AC power line and said sensing means comprises an AC voltage sensing means.

4. A supply according to claim 3 wherein said electrical energy storage means is connected to said input means and is adapted to store electrical energy received from the power line.

5. A supply according to claim 4 wherein said electrical energy storage means comprises a battery and a charger therefor.

6. A supply according to claim 5 wherein said switch means comprises a switch that electrically connects said illumination means to said battery during said given periods and electrically disconnects said illumination means from said battery during said other periods.

7. A supply according to claim 6 wherein said supplemental power supply comprises an uninterruptible power supply connected between said input means and said output means.

8. A supply according to claim 1 wherein said switch means is connected directly between said energy storage means and said illumination means and isolated from said supplemental power supply means so as to prevent electrical energy flow between said supplemental supply and said illumination means.

9. A supply according to claim 8 wherein said abnormalities comprise power interruptions in the power line.

10. A supply according to claim 9 wherein the power line is an AC power line and said sensing means comprises an AC voltage sensing means.

11. A supply according to claim 10 wherein said electrical energy storage means is connected to said input means and is adapted to store electrical energy received from the power line.

12. A supply according to claim 11 wherein electrical energy storage means comprises a battery and a charger therefor.

13. A supply according to claim 12 wherein said supplemental power supply comprises an uninterruptible power supply connected between said input means and said output means.

14. A supply according to claim 13 wherein said illumination means produces a minimum 1.0 milli standard candle power.

15. A supply according to claim 1 wherein said electrical energy storage means is connected to said input means and is adapted to store electrical energy received from the power line.

16. A supply according to claim 15 wherein said switch means is connected directly between said energy storage means and said illumination means and isolated from said supplemental power supply means so as to prevent electrical energy flow between said supplemental supply and said illumination means.

17. A supply according to claim 16 wherein said electrical energy storage means comprises a battery and a charger therefor.

18. A supply according to claim 17 wherein said illumination means produces a minimum 1.0 milli standard candle power.

19. A supply according to claim 1 wherein said illumination means produces a minimum 1.0 milli standard candle power.

* * * * *